H. S. FIRESTONE.
VEHICLE TIRE.
APPLICATION FILED NOV. 18, 1905.

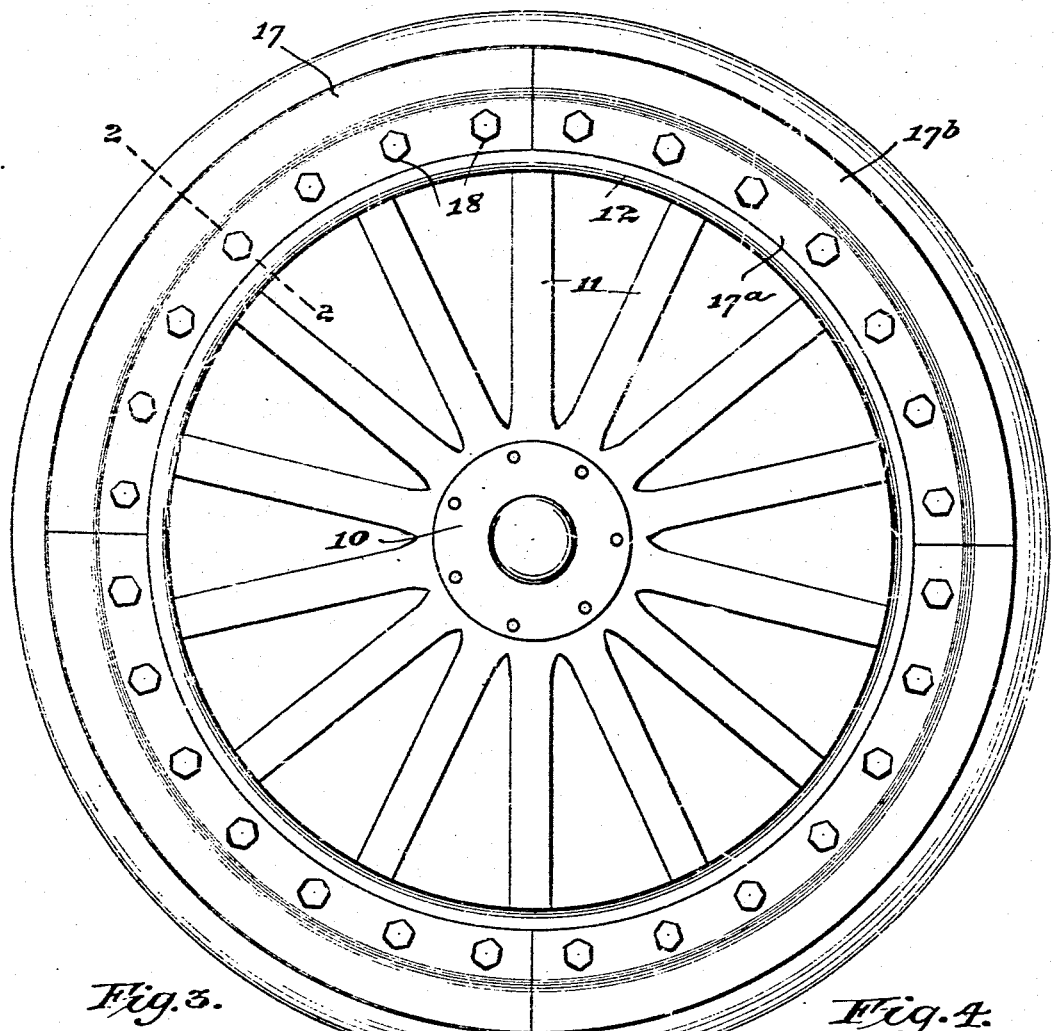

947,543.

Patented Jan. 25, 1910.

2 SHEETS—SHEET 2.

Witnesses
G. F. Mann
Walter M. Fuller

Inventor
Harvey S. Firestone
By Offield Towle & Linthicum

UNITED STATES PATENT OFFICE.

HARVEY S. FIRESTONE, OF AKRON, OHIO, ASSIGNOR TO FIRESTONE TIRE & RUBBER COMPANY, OF AKRON, OHIO, A CORPORATION OF WEST VIRGINIA.

VEHICLE-TIRE.

947,543.  Specification of Letters Patent.  Patented Jan. 25, 1910.

Application filed November 18, 1905. Serial No. 287,986.

*To all whom it may concern:*

Be it known that I, HARVEY S. FIRESTONE, a citizen of the United States, residing at Akron, in the county of Summit and State of Ohio, have invented certain new and useful Improvements in Vehicle-Tires, of which the following is a specification.

This invention relates to the art of resilient tires for vehicles; and has reference more particularly to novel features of the tire seating and securing means.

My present improvements are designed more particularly, although not exclusively, for use in connection with that type of tire employing transverse pins or similar fastening means embedded therein adapted for engagement at their ends with retaining devices, such as is illustrated by Letters Patent to Swinehart, No. 624,992, granted May 16, 1899.

The main object of the invention is to provide an improved means for preventing both unseating and creeping of the tire, for which purpose the side flanges of the rim are provided with internal clenching ribs and also with spaced inwardly projecting lugs that are so disposed as to press into the side walls of the tire-body. This improvement is preferably associated with that form of tire employing cross-pins embodied in the base thereof, in which case said inwardly projecting lugs lie between the ends of adjacent cross-pins.

My invention will be readily understood when considered in connection with the accompanying drawings forming a part of this specification, and in which,—

Figure 5:
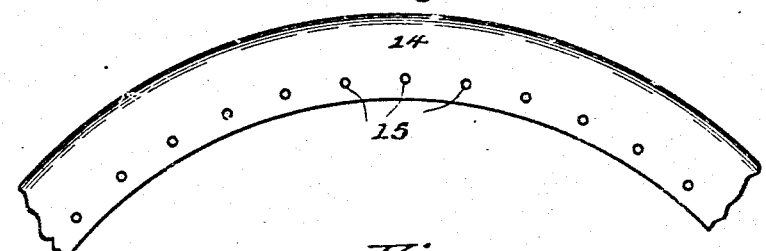
Figure 6:
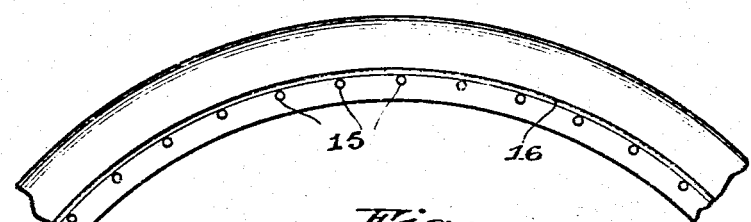
Figure 7:
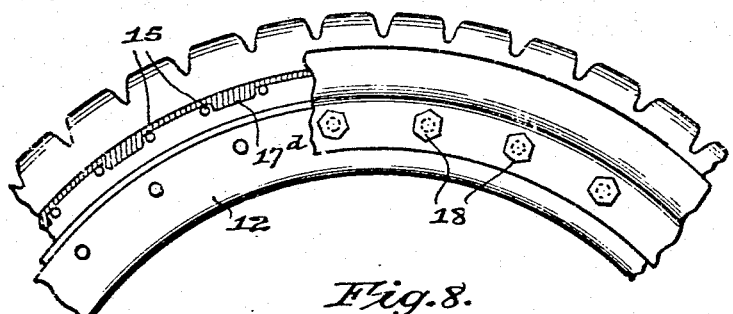
Figure 8:
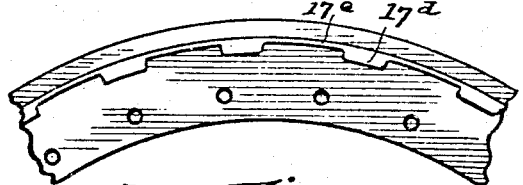
Figure 9:
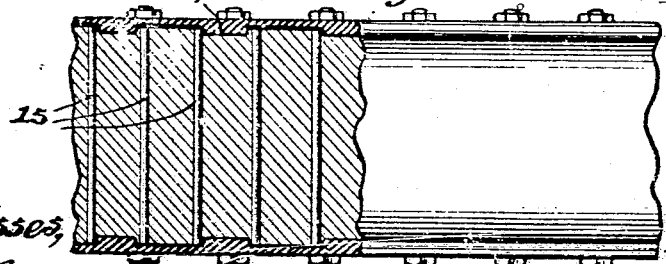

Figure 1 is a side elevation of a wheel such as is employed on automobiles and heavy wagons, having my improvements applied thereto; Fig. 2 is a cross-sectional view on the line 2—2 of Fig. 1; Fig. 3 is a view similar to Fig. 2, but showing a tire having a single broad tread instead of the dual tread shown in Fig. 2; Fig. 4 is a view similar to Figs. 2 and 3, showing the improvements applied to a tire having a corrugated tread of the type shown in side elevation in Fig. 7; Fig. 5 is a side elevational view of a fragment of a simple form of tire capable of use in connection with my present improvements; Fig. 6 is a similar view to Fig. 5, but showing the side of the tire as provided with an annular groove molded therein above the ends of the cross-pins for the reception of the clenching ribs of the side flanges; Fig. 7 is a side elevational view, partly in longitudinal section, through one side of the side flanges of the rim, showing the invention as applied to a tire having a corrugated tread; Fig. 8 is an inner side elevational view of a portion of one of the side flanges; and Fig. 9 is a top plan view, partly in section, of a portion of the tread and rim of Fig. 3.

Referring to the drawings, 10 may designate the hub, 11 the spokes, and 12 the rim or felly of the wheel.

13 designates an inner flat metal or other tire surrounding the periphery of the rim and co-extensive in width with the latter, this latter being preferably, although not essentially, employed.

14 (Figs. 1 and 2) designates the elastic or resilient tire member as a whole, which is preferably made of vulcanized rubber and with the dual tread clearly shown in Fig. 2. The base of the tire-body is provided with a series of suitably spaced cross-pins 15 embedded therein and extending from side wall to side wall of the tire. The tire is also preferably molded with annular grooves 16 in each side (Fig. 6) located just above the ends of the cross-pins 15; although the side flanges hereinafter described are capable of employment with a plain tire omitting such grooves, such as is shown in Fig. 5, to accomplish the purposes of the invention.

17 designates as an entirety the side flanges forming the lateral walls of the tire-seating rim, which flanges are preferably made in a plurality of sections, as shown in Fig. 1, although they may be made each as a single integral annular member, if desired. Describing these flanges more particularly, each comprises an inner flat portion 17$^a$ secured to the sides of the rim or felly 12 as by means of through bolts 18, and an outwardly swelled tire-engaging portion 17$^b$, which latter is provided on its inner or concave face with an annular clenching rib 17$^c$ adapted to engage the groove 16 of the tire (Fig. 6) and overlie the ends of the cross-pins 15; or, where the tire is formed without a molded groove, as in Fig. 5, being forced into the resilient material of the tire-body so as to overlie the ends of the cross-pins by the clamping effect of the through bolts 18. It will be observed that these clenching ribs are located somewhat inwardly of the outer peripheral portions of the flanges; or, to state it the other way, the side flanges extend outwardly along the side walls of the tire-body for some distance beyond the clenching ribs. The beneficial result and effect of this construction is to afford to the side walls of the tire-body a substantial lateral support beyond the clenchers, which greatly lessens the tendency of the tire to tear and break at and near the points where the cross-pins pierce the sides of the tire, and preserves the integrity of the tire as a whole against the disrupting tendency and effect of side strains. While this construction of side flange is especially useful in combination and coöperation with tires having cross-pins or similar devices embedded in base-portions, yet it may be used to advantage as a tire-fastening means with simple tires not employing such transverse reinforcements. Further describing the side flanges, I provide means thereon for preventing creeping of the tire, the same consisting of inwardly projecting lugs 17$^d$ (Figs. 7, 8 and 9) that are so disposed as to press into the side walls of the tire-body between adjacent cross-pins; these lugs or projections extending inwardly radially of the clencher ribs 17$^c$ sufficiently to lie between the ends of adjacent cross-pins and engage the latter to prevent a creeping movement of the tire in its seat. The tire-body may, of course, be molded, if desired, with depressions or indentations in its side walls to receive and seat these anti-creeping lugs 17$^d$; but in practice I find that this is unnecessary, since the resilient character of the tire-body permits a sufficient compression of the tire at these points to enable the lugs 17$^d$ to act as stops for the ends of the cross-pins. This anti-creeping means is especially useful when employed on automobile wheels and the like which are subjected to a traction effect in the propulsion of the vehicle.

Where a dual or other multiple tread tire is used in connection with the improvements thus far described, I still further increase the efficiency of the holding means by employing between adjacent tread portions an annular retaining wire 19 (Fig. 2) that overlies the cross-pins at a point or points intermediate their ends, producing a stiffening effect upon the latter and preventing the bowing of the tire base under side strains.

My present improvements, in so far as they relate to the side flanges of the rim may be useful and advantageously employed in connection with any form or construction of tire, whether the same be a plain solid tire as shown in Fig. 3, a multiple tread tire as shown in Fig. 2, or a corrugated tread tire as shown in Figs. 4 and 7; and hence it will be understood that these improvements are in no wise limited to their employment in connection with any special form of resilient tire-body.

I claim:

1. The combination with a wheel felly and a resilient tire mounted thereon, of side flanges secured to said felly and overlapping the sides of the tire, the overlapping portion of said flanges having ribs clenchingly engaging the tire and also having one or more laterally projecting lugs on the inner side of said ribs entering the sides of the tire and serving to prevent creeping of the latter, substantially as described.

2. The combination with a wheel felly and a resilient tire mounted thereon having cross-pins embedded in its base-portion, of side flanges secured to said felly and overlapping the sides of the tire, the overlapping portions of said flanges having laterally projecting lugs lying between the ends of adjacent cross-pins to prevent creeping of the tire, substantially as described.

3. The combination with a wheel felly and a resilient tire mounted thereon having cross-pins embedded in its base-portion, of side flanges secured to said felly and overlapping the sides of the tire, the overlapping portions of said flanges having parts clenchingly engaging the tire and also having laterally projecting lugs lying between the ends of adjacent cross-pins to prevent creeping of the tire, substantially as described.

HARVEY S. FIRESTONE.

Witnesses:
JAS. A. BENNER,
STACY G. CARKHUFF.